Jan. 18, 1944. C. D. MACGILL 2,339,578
OPTICAL SIGHTING APPARATUS
Filed June 9, 1941
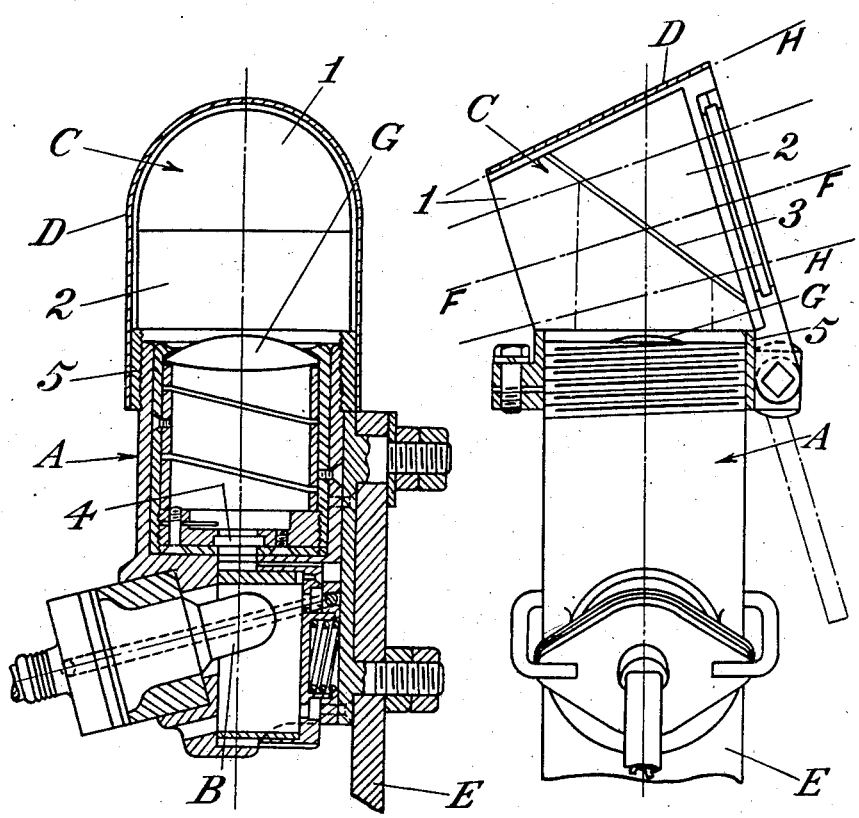
Inventor
Charles Dalrymple Macgill
per
Lancaster, Allwine and Rommel
Attorneys.

Patented Jan. 18, 1944

2,339,578

UNITED STATES PATENT OFFICE 2,339,578

OPTICAL SIGHTING APPARATUS

Charles Dalrymple Macgill, Anniesland, Glasgow, Scotland, assignor to Barr and Stroud Limited, Anniesland, Glasgow, Scotland Application June 9, 1941, Serial No. 397,328
In Great Britain August 28, 1939

2 Claims. (Cl. 88—1)

This invention refers to optical sighting apparatus of what may be termed the transparent reflecting mirror type, i. e., sights designed to form an optical reference image in the observer's line of sight to the target by reflection of light upon an obliquely arranged mirror capable of transmitting and reflecting light, through which the observer sees the target directly simultaneously with the reference image. Light for the formation of the reference image is projected on to the mirror in a lateral direction, the term "lateral" including projection in any direction more or less at right angles to the line of sight. In its simplest form the transparent reflecting mirror comprises a parallel faced transparent plate of glass set obliquely to the line of sight, but the transparent reflecting mirror may be formed by means of a prism combination as hereinafter more fully explained.

According to this invention, in a sight of the transparent reflecting mirror type, the mirror is provided with a protecting hood of thin material, which allows for the projection of light on to the mirror laterally and which is of a divergent or tapered form the hood diverging forwardly in the direction away from the observer's eye whereby the observer may assume a position to the rear of the hood so that its taper conforms substantially with the convergent pencil of rays of light through the hood and mirror from the field of observation to the eye of the observer, thus reducing obstruction in the field of view to a minimum, in that only the edge of the hood appears to the observer.

Preferably the mirror is of rounded shape and the hood is of conical character to correspond therewith.

In one example of construction, the mirror and its hood are mounted on the upper end of a normally upright tubular light projecting arrangement, the hood extending in arch-fashion over the mirror and allowing for projection of light to the mirror from below.

The hood may cover a mirror formed by means of two clear transparent prisms placed close together, so that a sealed air space of minute thickness exists between two parallel plane faces, one on each prism, oblique to the observer's line of sight to the target, the glass/air interface constituting the reflecting surface, or the hood may cover a mirror formed by means of two clear transparent prisms held together on two plane faces oblique to the line of sight, with one or both of the faces lightly metallised to reflect light from the light projecting system while giving sufficient transparency for the observer to see the target directly, the hood and the upper parts of the prisms in both cases being shaped to a conical form as hereinbefore described.

The invention will now be described with reference to the accompanying drawing in which—

Figure 1 is a sectional elevation of a sight provided with a hood in accordance with this invention, and Figure 2 is an elevation, partly in section at right angles to the elevation shown in Figure 1.

The sight comprises a collimating light projecting device A of tubular construction illuminated by a lamp B, a transparent reflecting mirror arrangment C mounted upon the light projecting device A, and a metal hood D, the whole being mounted, say on a gun, by means of a bracket E.

The manner of mounting the lamp B forms no part of the present invention and is disclosed and claimed in a copending application for U. S. patent of James Weir French, filed June 9, 1941, Serial No. 397,339.

The transparent reflecting mirror arrangement comprises two prisms 1 and 2 secured together with an air space 3 of minute thickness between them sealed from the atmosphere, or alternatively in contact at 3 with one or both of the contacting faces lightly aluminised or rhodiumised to give both reflection and transparency.

The observer's line of sight is denoted by F—F. An image of a graticule 4 is formed by a collimating lens G and is brought into the line of sight by reflection at the interface 3.

The hood is of thin metal and is of arch shape, as shown in Figure 1, with its upper part of a conical form diverging forwardly in the direction away from the observer's eye, whereby the observer may take the position hereinbefore described, the convergent pencil of rays of light through the open ends of the hood and through the mirror to the eye of the observer being indicated at H—H. As a result of this arrangement the hood causes little or no optical obstruction.

The hood is secured to a base 5, which is screwed on to the upper end of the tubular body of the light projecting device.

It will be appreciated that, instead of the mirror being formed by a prism combination as described, a simple glass plate rounded at its upper edge, may be used enclosed within the hood.

I claim:

1. A sight comprising a mirror capable of transmitting and reflecting light, arranged obliquely to the observer's line of sight; a graticule laterally of the observer's line of sight from which light is projected on the reflecting surface of said mirror in a lateral direction relative to the line of sight, to form, by reflection, a reference image at the mirror; and a protecting hood, of relatively thin material and of arch-like formation, about said mirror, said hood open at its side for projection of the graticule image onto said mirror, open at its ends for sighting through the hood and mirror, and having a tapered portion diverging forwardly in a direction away from the observer's eye, whereby the observer may assume a position to the rear of the hood so that the tapered portion thereof conforms substantially with the convergent pencil of rays of light through the hood and mirror from the field of observation to the eye of the observer, and the tapered portion of the hood presents minimum obstruction in the field of the observer.

2. A sight comprising an upright tubular body; a mirror capable of transmitting and reflecting light mounted upon said tubular body obliquely to the axis thereof; a graticule within the tubular body from which light is projected onto the mirror to form, by reflection at the screen, a reference image in the observer's line of sight through the mirror, which line of sight is substantially normal to the axis of said tubular body; and a protecting hood, of relatively thin material and of arch-like formation, disposed laterally of and above said mirror, at least the portion of the hood above said mirror being tapered and diverging forwardly in a direction away from the observer's eye, whereby the observer may assume a position to the rear end of the hood so that the said tapered portion thereof conforms substantially with the convergent pencil of rays of light through the hood and mirror from the field of observation to the eye of the observer, and the tapered portion of the hood presents minimum obstruction in the field of the observer.

CHARLES D. MACGILL.